United States Patent [19]

Dupuy

[11] Patent Number: 5,511,344
[45] Date of Patent: Apr. 30, 1996

[54] MOLDED WHEELHOUSE SEAL FOR AUTOMOTIVE VEHICLES

[75] Inventor: Ronald E. Dupuy, Wabash, Ind.

[73] Assignee: GenCorp Inc., Fairlawn, Ohio

[21] Appl. No.: 334,636

[22] Filed: Nov. 4, 1994

Related U.S. Application Data

[63] Continuation of Ser. No. 96,347, Jul. 22, 1993.

[51] Int. Cl.⁶ .................................................. E06B 7/232
[52] U.S. Cl. ........................ 49/496.1; 49/475.1; 49/484.1; 296/146.9
[58] Field of Search ................... 49/475.1, 484.1, 49/493.1, 496.1; 296/146.9, 206

[56] References Cited

U.S. PATENT DOCUMENTS

| | | |
|---|---|---|
| 1,763,603 | 6/1930 | Donahue . |
| 1,991,674 | 2/1935 | Hughes . |
| 2,158,808 | 5/1939 | Wetzel ................... 49/496.1 |
| 2,833,589 | 5/1958 | Ahrens ................... 49/484.1 |
| 2,935,771 | 5/1960 | Hatcher, Jr. . |
| 3,382,619 | 5/1968 | Bemis . |
| 3,436,891 | 4/1969 | Church . |
| 3,456,390 | 7/1969 | Hulverson et al. . |
| 4,222,603 | 9/1980 | Breitschwerdt et al. ........... 296/146.9 |
| 4,277,099 | 7/1981 | Klein et al. .................... 49/484.1 X |
| 4,525,953 | 7/1985 | Stutzman . |
| 4,819,381 | 4/1989 | Kitaura et al. . |
| 4,892,348 | 1/1990 | Nozaki .................... 296/146.9 |
| 4,957,301 | 9/1990 | Clay et al. ............... 49/496.1 X |
| 5,010,691 | 4/1991 | Takahashi . |
| 5,052,743 | 10/1991 | Inada et al. . |

FOREIGN PATENT DOCUMENTS

| | | | |
|---|---|---|---|
| 3934597 | 4/1991 | Germany ............... | 296/146.9 |

*Primary Examiner*—Jerry Redman
*Attorney, Agent, or Firm*—Robert F. Rywalski; Daniel J. Hudak

[57] ABSTRACT

An automotive wheelhouse sealing strip for providing a secondary seal to prevent infiltration and accumulation of dirt and mud in the gap between a rear door and a rear door opening in the vicinity of the wheelhouse of a four-door sedan vehicle includes a fully molded weather sealing member which is formed to accurately conform to the shape of the portion of the door opening to which the weather sealing member is to be attached, thereby providing an aesthetically pleasing tight engagement between the vehicle body and the sealing member. The sealing strip generally includes a weather sealing lip having a sealing surface which sealingly abuts an inner peripheral surface of a vehicle rear door when the rear door is in the closed position, and a base portion which is adapted to be attached to a vehicle body part at a peripheral surface generally defining the rear door opening.

3 Claims, 1 Drawing Sheet

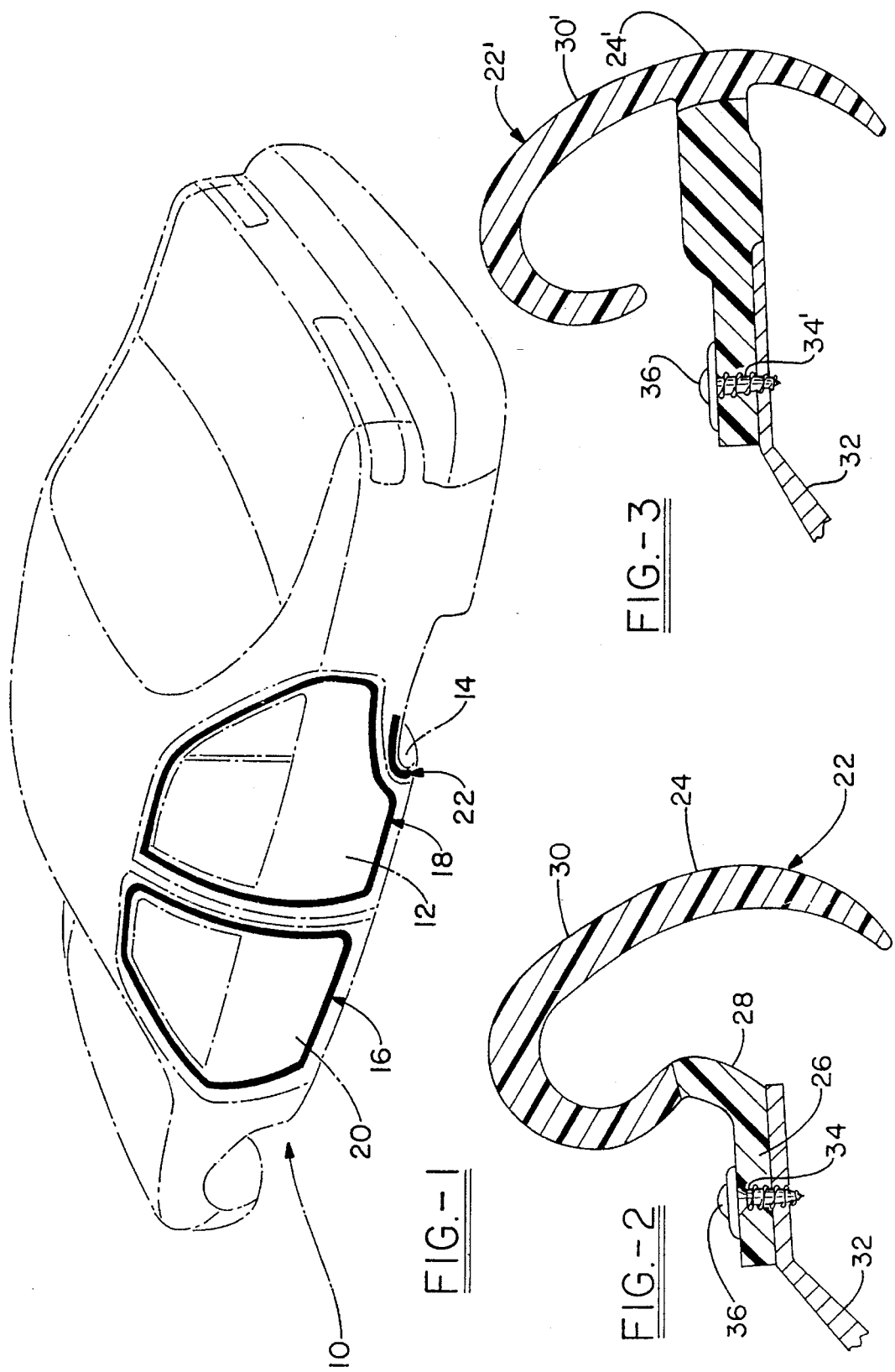

MOLDED WHEELHOUSE SEAL FOR AUTOMOTIVE VEHICLES

This application is a continuation of application Ser. No. 08/096,347, filed on Jul. 22, 1993, by Ronald E. Dupuy for MOLDED WHEELHOUSE SEAL FOR AUTOMOTIVE VEHICLES.

FIELD OF THE INVENTION

The present invention relates to weather seals for automotive vehicles, and more particularly to a weather seal which is capable of accurately conforming to supporting structure of a vehicle door opening having curved, bent or other complicated shapes.

BACKGROUND OF THE INVENTION

For four-door sedan vehicles which generally have the rear wheels very close to the rear doors, it has been found that when driving on wet, dirty and muddy roads, dirt and mud will typically accumulate between the door and door opening outboard from the primary door seal in the area immediately forward of the rear wheelhouse. In some extreme cases the primary seal has been found to be ineffective at preventing water and dirt thrown by the rear wheel at the area between the door and door opening from entering the passenger compartment of the vehicle. In either case, unsightly accumulations of dirt and mud are deposited between the wheelhouse and the door, requiring additional effort during cleaning and presenting a risk to rear seat passengers of soiling clothing during entrance into, or egress from the vehicle. Moreover, because of the proximity of the door opening to the rear wheels of such vehicles, undesirable road noise levels are often encountered.

In response to the problem of dirt and mud accumulating between the rear wheelhouse and the rear passenger door of four door sedans, and to reduce noise levels, automobile manufacturers have provided a secondary wheelhouse weather seal which is attached to the wheelhouse sheet metal and resides in the gap between the door opening and the door, outboard from the primary door seal. Conventional wheelhouse seals are extruded elastomeric materials which have a constant transverse cross sectional size and shape which is not readily conducive to achieving an aesthetically pleasing, tight fit capable of accurately tracking the shape of the gap between the door and the door opening, especially when the door opening has a complicated non-linear or non-circular shape such as a door opening having offsets, indentations, sharp turns, or a variable radius of curvature. In order to facilitate a better fit of the extruded wheelhouse weather seals to the vehicle rear door opening, molded details, metal inserts, or both are generally utilized. Molded details are frequently used as transitional pieces between separate extruded weather sealing members to conceal gaps therebetween, especially when it is not possible, or is extremely difficult, to follow the shape of a door opening with a single extruded weather sealing strip, as is the case with sharp turns, offsets, indentations and other complicated door opening shapes at the vicinity of the wheelhouse. Metal inserts embedded within the weather sealing strips are often provided such as by coextruding techniques to serve as shape retention means for forcing the weather sealing strips to more accurately track the shape of complicated door openings, such as those having a variable radius of curvature, sharp curves, or the like. Frequently, molded inserts are used in combination with metal inserts and a plurality of sealing members are utilized in a wheelhouse weather sealing assembly to provide a suitable fit between the sealing members and the door opening.

While the prior art wheelhouse weather sealing assemblies have generally achieved sufficient conformity with automotive vehicle rear door openings to reduce road noise and provide suitable sealing against dirt and mud, installation is complicated, involving the attachment of a plurality of components such as molded transitional pieces and complicated coextrusions having metal inserts. Such prior art seal assemblies generally do not provide an aesthetically pleasing, continuously perfect fit between the sealing members and the vehicle door opening and often include unsightly discontinuities and irregularities. The foregoing deficiencies have resulted in high installation and manufacturing costs, an aesthetically unpleasing appearance, and a slight but undesirable increase in total vehicle weight.

Accordingly, an inexpensive, lighter weight, single component wheelhouse sealing system capable of achieving a more accurate, more aesthetically pleasing, and tighter fit with the vehicle door opening would be highly desirable.

SUMMARY OF THE INVENTION

The present invention is a single component automotive wheelhouse weather sealing system for sealing the gap between a vehicle rear door and a vehicle rear door opening to prevent or at least reduce intrusion and accumulation of dirt and mud at the immediate vicinity of the rear wheelhouse outboard from the primary door seal, and to reduce road noise.

The invention overcomes the problems and disadvantages encountered with the prior art by providing a simpler, less costly, lighter weight, and more aesthetically pleasing fully molded weather seal. The fully molded weather seal of the invention is designed to accurately conform to the shape of the door opening in an automotive vehicle, thereby eliminating the need for a plurality of individual extruded weather seal members, molded details such as transitional pieces between separate extruded weather seal members, and metal inserts which force the weather sealing members to conform to the contours of the vehicle body door opening. The fully molded weather sealing strip of the invention, by reducing the number of components needed to achieve an accurate fit to the shape of a vehicle body door opening, achieves a substantial savings in production costs, particularly labor costs, as compared with conventional multiple component weather sealing systems. A substantial reduction in labor is also expected during installation of the fully molded weather seal onto an automotive vehicle body, because fewer pieces are needed and because the fully molded weather seal of the invention accurately conforms to the shape of the vehicle door opening, whereby less effort is required to conform the seal to the shape of the door opening than with extruded seals having metal inserts. Furthermore, because the seal does not require metal inserts, a lighter weight weather sealing system is provided by the invention, thereby contributing to the cumulative or overall weight reduction which automotive vehicle manufacturers are continually attempting to achieve for purposes of improving fuel economy. Also, by accurately conforming to the shape of an automotive vehicle door opening prior to installation, a tighter, more aesthetically pleasing appearance is provided by the fully molded, one-piece sealing member of the invention, without the need for unsightly molded details, such as transitional pieces which conceal gaps between conventional extruded sealing members at sharp turns in the shape of the door opening or at areas having variable curvature, including short radius curves.

The molded wheelhouse weather seal of the invention can be formed of a single moldable polymeric material such as rubber or an elastomeric thermoplastic, or can be formed of two or more different materials such as a combination of materials including rubbers, elastomeric thermoplastics, and rigid thermoplastic, with at least the sealing portions being made of a relatively soft and resilient elastomeric material. The seal is preferably formed with integral slots or other integral means for mounting the seal to the vehicle body along the portion of the rear door opening adjacent the wheelhouse.

BRIEF DESCRIPTION OF THE DRAWINGS

FIG. 1 is a perspective view of a four-door sedan vehicle in which the wheelhouse weather sealing strip of the invention is utilized;

FIG. 2 is a cross-section of a preferred embodiment of the wheelhouse sealing strip; and FIG. 3 is a cross-section of an alternative preferred embodiment of the wheelhouse sealing strip of the invention.

DETAILED DESCRIPTION OF THE PREFERRED EMBODIMENTS

The invention is described in further detail relative to the preferred embodiments thereof shown in FIGS. 1–3.

A typical four-door sedan 10 wherein the rear doors 12 are located in very close proximity to the rear wheelhouse 14 is shown in FIG. 1. Primary door seals 16 and 18 are provided on both the front doors 20 and rear doors 12, respectively. The primary seals are generally attached to the doors with the sealing portions of the primary seals sealingly abutting along relatively inboard portions of the door opening to prevent water, dirt and air from entering the passenger compartment from the outside, and to reduce road noise. For a four-door sedan 10 of the type shown in FIG. 1, wherein a portion of the rear door is situated immediately adjacent and partially overlying the rear wheelhousing, water, dirt and mud is typically thrown against the lower portion of the gap between the door and the door opening and accumulates within that portion of the gap generally overlying the wheelhouse forward of the rear wheel axle. In order to prevent, or at least substantially reduce, such accumulations of dirt and mud outboard from the primary seal, a secondary wheelhouse seal 22 is provided along the lower portion of the door opening. The wheelhouse seal 22 generally extends along the door opening from the rearward bottom edge of the door opening upwardly and backwardly along the door opening to a point approximately directly above the rear wheel axle, and is located outboard from the primary seal but inboard relative to the outer surfaces of the vehicle. Prior art wheelhouse sealing strips are generally linear extrusions which must be bent to conform to the shape of the vehicle door opening. The invention, by contrast, is a one-piece, fully molded sealing member which is pre-formed to accurately conform to the shape of a portion of the door opening to which the weather seal is attached without requiring any bending or other post-fabrication forming steps during installation.

While the rear wheelhouse sealing member of the invention can, if desired, have a variable transverse cross-sectional size and shape, such cross-sections will nevertheless have the same general features as shown in each of the transverse cross-sectional views of FIGS. 2 and 3, which depicts two alternative preferred embodiments of the invention.

FIG. 2 shows a transverse cross-section of a preferred embodiment of the fully molded wheelhouse weather sealing strip of the invention. The wheelhouse weather sealing strip 22 accordance with the invention is molded to accurately follow the shape of the door opening in the immediate vicinity of the wheelhouse 14 and thereby ensure a tight fit of the wheelhouse weather sealing strip to the vehicle door opening. As seen in FIG. 2, a transverse cross-section of the preferred embodiment includes a sealing lip portion 24 generally having an approximately sickle- or crescent-shape, and an integrally formed stem or base portion 26 connected to one end of the sealing lip portion by a transitional portion 28 extending outwardly from the base. The overall cross-sectional shape of the wheelhouse weather sealing strip 22, including the sealing lip portion, the transitional portion and the base portion, roughly approximates a hook-shape. An outer sealing surface 30 sealingly abuts an inner peripheral surface of the door 12 when the door is in the closed position. The base portion 26 is mounted to a vehicle body port 32 at a peripheral surface generally defining the rear door opening. To facilitate attachment of the wheelhouse weather seal 22 to the vehicle rear door opening, a plurality of fastener holes 34 are preferably provided in spaced-apart relationship along the length of the wheelhouse weather seal. Any of various conventional fasteners 36, such as screws or rivets can be used for attaching the wheelhouse weather seal to a vehicle body part 32.

The wheelhouse weather seal 22 can be molded from a single moldable polymeric material such as an elastomeric thermoplastic or a rubber material. A suitable material for molding the wheelhouse weather seal is available from Monsanto Industrial Chemicals Co. and is sold under the trademark "Santoprene." The weather sealing strip of the invention can also, if desired, be molded from two or more different materials by methods well known in the art provided that the sealing lip portion is formed from a relatively soft, low durometer, resilient material having elastomeric properties. For example, the base 26 and transitional portion 28 can be molded from a rigid thermoplastic while the sealing lip portion is co-molded from an elastomeric material.

FIG. 3 shows a cross-section of an alternative preferred embodiment of the fully molded wheelhouse weather sealing strip 22' of the invention. The sealing strip includes a sealing lip portion 24' and a base portion 26' which is directly attached approximately orthogonally to the inner or concave side of the sealing lip portion opposite of the sealing surface 30'. The alternative preferred embodiment of the wheelhouse weather sealing strip 22' is otherwise generally similar to that of the preferred embodiment shown in FIG. 2 and described above.

While in accordance with the Patent Statutes, a preferred embodiment and best mode has been presented, the scope of the invention is not limited thereto, but rather is measured by the scope of the attached claims.

What is claimed is:

1. In a vehicle including a passenger compartment, a rear door and rear door opening having a configuration partially defined by a wheelhouse, a primary door opening seal attached to said rear door, said primary door opening seal having sealing portions which sealingly abut inboard portions of the rear door opening to seal the passenger compartment, and a secondary wheelhouse weather seal which is attached to the wheelhouse and resides in a gap between the door opening and the door, the improvement comprising said secondary wheelhouse weather seal being a molded, unitary sealing member configured to accurately conform to a non-linear shape of a portion of the rear door opening to which the secondary wheelhouse weather seal is to be attached, said secondary wheelhouse weather seal being located along the door opening outboard from the primary door seal and inboard relative to an outer surface of the vehicle and extending upwardly and backwardly along the door opening.

2. A vehicle according to claim 1, wherein said secondary wheelhouse weather seal comprises:

a substantially planar base molded from a rigid thermoplastic and including a plurality of fastener holes to secure said secondary wheelhouse weather seal to said portion of said rear door opening;

a sickle-shaped sealing lip molded from a resilient material; and a transitional portion integrally joining said base and said sealing lip, said secondary wheelhouse weather seal being non-linear along its longitudinal axis so as to correspond to the shape of said portion of said rear door opening.

3. A vehicle according to claim 1, wherein a transverse cross section of the secondary wheelhouse weather seal varies in size and shape to accommodate variations in the door opening or gap between the door and door opening.

* * * * *